US008578334B2

(12) United States Patent
Nathan et al.

(10) Patent No.: US 8,578,334 B2
(45) Date of Patent: Nov. 5, 2013

(54) DYNAMIC LANGUAGE-BASED INTEGRATED DEVELOPMENT ENVIRONMENT

(75) Inventors: Adam D. Nathan, Kirkland, WA (US); John I. Montgomery, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1844 days.

(21) Appl. No.: 11/633,209

(22) Filed: Dec. 4, 2006

(65) Prior Publication Data

US 2008/0134142 A1    Jun. 5, 2008

(51) Int. Cl.
*G06F 9/44*    (2006.01)

(52) U.S. Cl.
USPC .......................................................... 717/123

(58) Field of Classification Search
USPC .................................... 715/705, 711; 717/123
See application file for complete search history.

(56) References Cited

U.S. PATENT DOCUMENTS

| | | | |
|---|---|---|---|
| 5,642,511 A | 6/1997 | Chow et al. | |
| 5,872,973 A * | 2/1999 | Mitchell et al. | 717/116 |
| 6,023,271 A * | 2/2000 | Quaeler-Bock et al. | 715/866 |
| 6,061,721 A * | 5/2000 | Ismael et al. | 709/223 |
| 6,078,743 A | 6/2000 | Apte et al. | |
| 6,237,135 B1 | 5/2001 | Timbol | |
| 6,305,008 B1 * | 10/2001 | Vaidyanathan et al. | 717/111 |
| 6,467,081 B2 * | 10/2002 | Vaidyanathan et al. | 717/123 |
| 6,493,719 B1 | 12/2002 | Booth et al. | |
| 6,609,246 B1 | 8/2003 | Guhr et al. | |
| 7,127,707 B1 | 10/2006 | Mishra et al. | |
| 7,150,008 B2 * | 12/2006 | Cwalina et al. | 717/126 |
| 7,155,662 B1 * | 12/2006 | Edwards et al. | 715/229 |
| 7,322,023 B2 * | 1/2008 | Shulman et al. | 717/112 |
| 7,406,687 B1 * | 7/2008 | Daynes et al. | 717/118 |
| 7,490,292 B2 * | 2/2009 | Hennum | 715/714 |
| 7,606,782 B2 * | 10/2009 | Haley | 706/50 |
| 7,669,184 B2 * | 2/2010 | Bracha et al. | 717/116 |
| 7,971,194 B1 * | 6/2011 | Gilboa | 717/116 |
| 2004/0148588 A1 * | 7/2004 | Sadiq | 717/109 |
| 2005/0034109 A1 | 2/2005 | Hamilton et al. | |
| 2005/0050470 A1 * | 3/2005 | Hudson et al. | 715/711 |
| 2005/0114771 A1 * | 5/2005 | Piehler et al. | 715/536 |
| 2005/0229154 A1 * | 10/2005 | Hiew et al. | 717/110 |
| 2005/0246664 A1 * | 11/2005 | Michelman et al. | 715/856 |
| 2005/0278695 A1 | 12/2005 | Synovic | |

(Continued)

OTHER PUBLICATIONS

Samuel A. Rebelsky, "CS223 2004F: Introspection in Java," Dec. 7, 2004. http://www.cs.grinnell.edu/%7Erebelsky/Courses/CS223/2004F/Handouts/introspection.html.*

(Continued)

*Primary Examiner* — Anna Deng
*Assistant Examiner* — Junchun Wu

(57) ABSTRACT

Various technologies and techniques are disclosed for providing an integrated development environment using a dynamic language. Input is received from a user in the form of a code command. Introspection is used to generate a list of one or more possible code command completion suggestions that are suitable completions for the input received from the user. A list of the possible code command completion suggestions are displayed to the user. Upon receiving input from a user to interact with a particular function in the integrated development environment, introspection can be used to analyze a source code section containing the particular function to extract at least one code comment contained within the function. The code comment is displayed to the user as documentation for the particular function.

11 Claims, 8 Drawing Sheets

(56) References Cited

U.S. PATENT DOCUMENTS

2006/0047653 A1    3/2006   Vaidyanathan et al.
2006/0184925 A1    8/2006   Ficatier et al.
2007/0168949 A1*   7/2007   Shattuck et al. .............. 717/115

OTHER PUBLICATIONS

Rahman et al. "Making Frameworks More Useable: Using Model Introspection and Metadata to Develop Model Processing", Apr. 2003, Elsevier Ltd.*

Buchner et al. "Introspective Model-Driven Development", pp. 33-49 2006, Springer-Verlag Berlin Heidelberg.*

"JavaScript Plus", http://www.vbsoftware.cl/features.htm.

Doernhoefer, Mark, "Surfing the Net for Software Engineering Notes", Jul. 2006, pp. 16-24, vol. 31, Issue 4, ACM Press, New York, US, http://delivery.acm.org.

Pfeiffer et al., "Complex code querying and navigation for AspectJ", 2005, pp. 60-64, ACM Press, New York, US, http://delivery.acm.org.

* cited by examiner

DYNAMIC LANGUAGE-BASED INTEGRATED DEVELOPMENT ENVIRONMENT

BACKGROUND

JavaScript is one of the most popular programming languages in existence but there are few tools for building applications with JavaScript or any other dynamic language. The tools that exist typically require a Web developer to download and install a product in order to get developer productivity features such as command completion suggestions (called INTELLISENSE® in the VISUAL STUDIO® development programs offered by MICROSOFT®), or the developer must simply make do without such features. This experience (requiring developers to download and install software) is contrary to the kinds of applications that JavaScript encourages, which are typically browser-based and can be accessed simply by visiting a Web page.

When developers want to know how something works, they typically read the documentation. The process of creating documentation is often laborious, however, involving not just the developer of the feature in question but writers and editors who actually create the documentation. Most developers have already included substantial information in their source code in the form of comments.

SUMMARY

Various technologies and techniques are disclosed for providing an integrated development environment using a dynamic language. In one implementation, command completion suggestions are generated dynamically using introspection. For example, input is received from a user in the form of a code command. Introspection is then used to generate a list of one or more possible code command completion suggestions that are suitable completions for the code command input received from the user. Part or all of the possible code command completion suggestions are displayed to the user.

In another implementation, function documentation is generated dynamically using introspection. For example, upon receiving input from a user to interact with a particular function in the integrated development environment, introspection can be used to analyze a source code section containing the particular function to extract at least one code comment contained within the function. Part or all of the code comment is then displayed to the user as documentation for the particular function.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
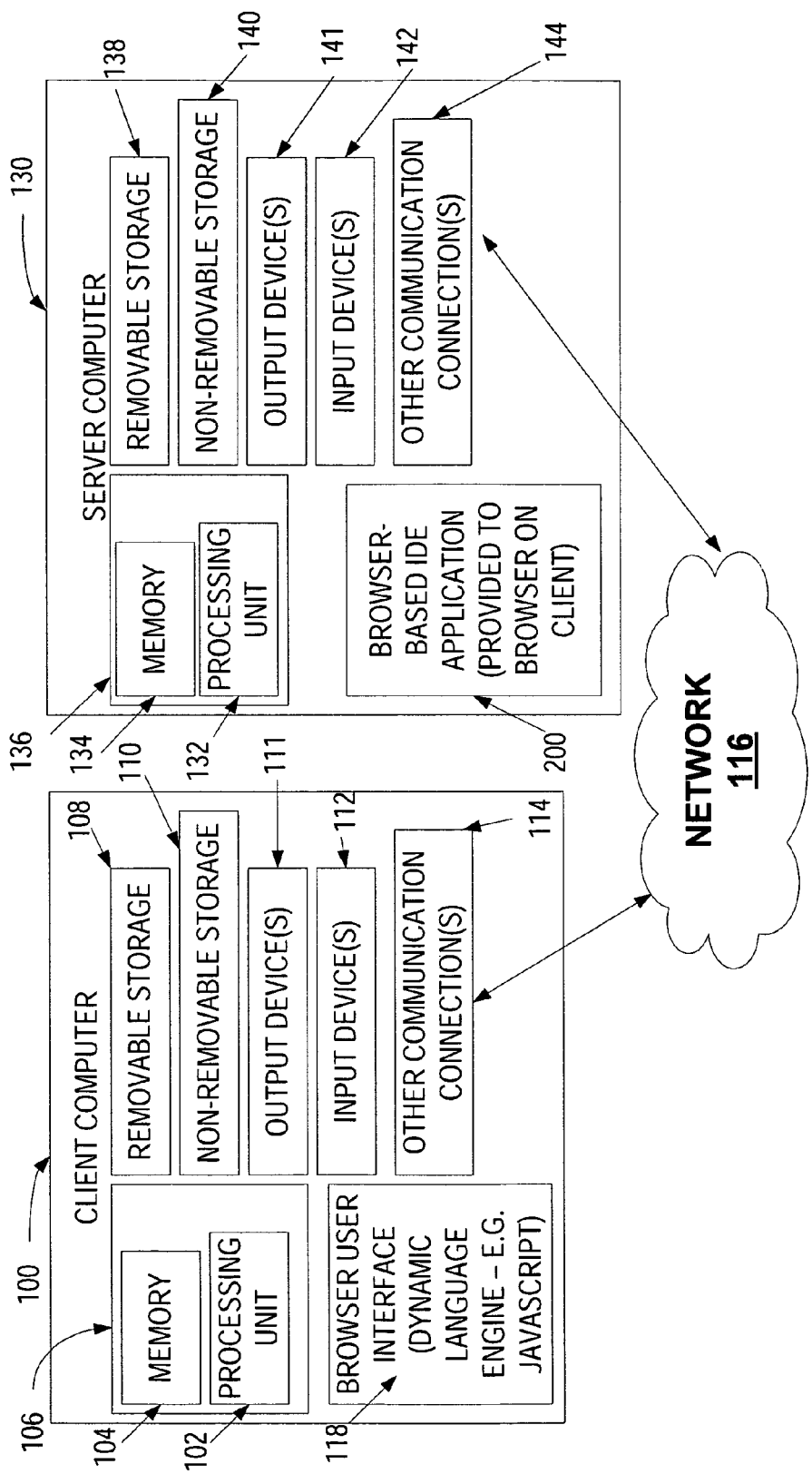
FIG. 1 is a diagrammatic view of a computer system of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as a software development application, but the system also serves other purposes in addition to these. In one implementation, one or more of the techniques described herein can be implemented as features within a software development program such as MICROSOFT® VISUAL STUDIO®, Eclipse, Macromedia Dreamweaver, or from any other type of program or service that allows a user to create software for one or more operating system platforms. In one implementation, a browser-based software development application is provided that is accessible by a user in a browser user interface.

In computer programming, the term introspection refers to the ability to examine something to determine what it is, what it knows, and what it is capable of doing. Using some or all of the techniques discussed herein, introspection can be used to dynamically generate documentation for a browser-based integrated development environment application that is based upon a dynamic language such as JavaScript. That documentation can then be displayed to the user in one or more ways to aid with software development. For example, a list of one or more possible code command completion suggestions that are suitable completions for the code command input received from the user can be generated dynamically using introspection. Alternatively or additionally, function documentation can be generated dynamically using introspection.

As shown in FIG. 1, an exemplary computer system to use for implementing one or more parts of the system includes one or more computing devices, such as computing devices 100 and/or 130. In its most basic configuration, computing devices 100 and/or 130 typically include at least one processing unit (102 and 132, respectively) and memory (104 and 134, respectively). Depending on the exact configuration and type of computing device, memory 104 or 134 may be volatile (such as RAM), non-volatile (such as ROM, flash memory, etc.) or some combination of the two. This most basic configuration is illustrated in FIG. 1 by lines 106 and 136.

Additionally, devices 100 and/or 130 may also have additional features/functionality. For example, devices 100 and/or 130 may also include additional storage (removable and/or non-removable) including, but not limited to, magnetic or optical disks or tape. Such additional storage is illustrated in FIG. 1 by removable storage (108 and 138, respectively) and non-removable storage (110 and 140, respectively). Computer storage media includes volatile and nonvolatile, removable and non-removable media implemented in any method or technology for storage of information such as computer readable instructions, data structures, program modules or other data. Memory 104 and 134, removable storage 108 and 138, and non-removable storage 110 and 140 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100 and/or 130. Any such computer storage media may be part of device 100 and/or 130.

Computing devices 100 and/or 130 include one or more communication connections that allow computing devices 100 and/or 130 to communicate with each other and/or one or more other computing devices (150, 160, and 170, respectively) over network 116. Communications connection(s) 114 and 144 are examples of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

In one implementation, computing device 100 is a client computer that communicates with server computer 130 using communication connection 114 and 144 over network 116. In such an implementation, browser user interface 118 of client computing device 100 accesses browser-based integrated development environment application 200 on server computing device 130 for performing one or more software development tasks. In one implementation, browser-based user interface 118 of client computing device 100 is a thin client user interface that displays the integrated development environment application 200 to a user, and server computing device 130 is a web server that provides the integrated development environment application 200 to the user upon request from the browser.

Computing devices 100 and 130 may also have input device(s) (114 and 134, respectively) such as keyboard, mouse, pen, voice input device, touch input device, etc. Output device(s) (116 and 136, respectively) such as a display, speakers, printer, etc. may also be included. These devices are well known in the art and need not be discussed at length here.

Figure 2:
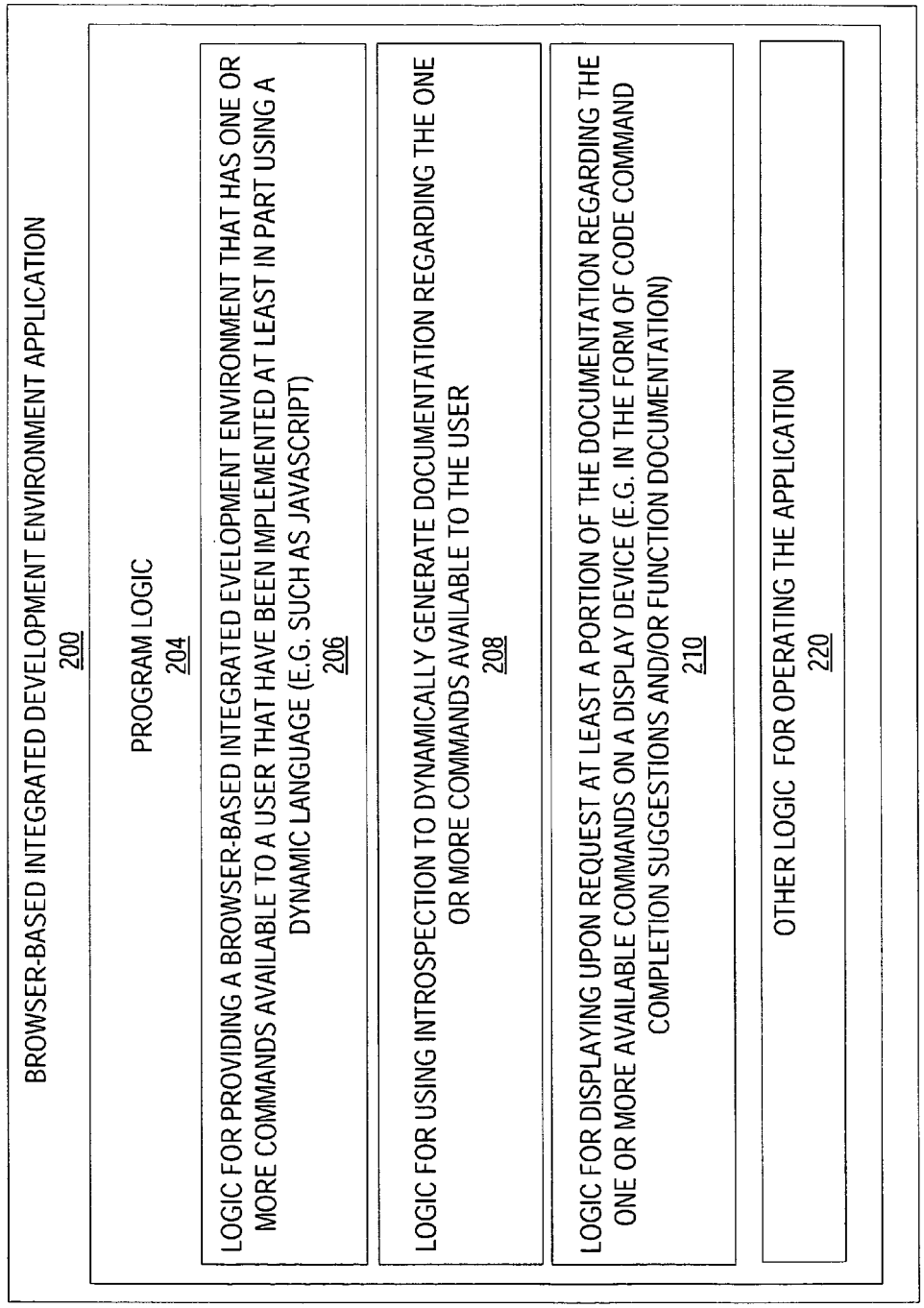
FIG. 2 is a diagrammatic view of browser-based integrated development environment application of one implementation operating on the computer system of FIG. 1.

Turning now to FIG. 2 with continued reference to FIG. 1, a browser-based integrated development environment application 200 operating on computing device 100 is illustrated. Browser-based integrated development environment application 200 is one of the application programs that reside on computing device 100. However, it will be understood that browser-based integrated development environment application 200 can alternatively or additionally be embodied as computer-executable instructions on one or more computers and/or in different variations than shown on FIG. 1. Alternatively or additionally, one or more parts of browser-based integrated development environment application 200 can be part of system memory 104, on other computers and/or applications 115, or other such variations as would occur to one in the computer software art.

Browser-based integrated development environment application 200 includes program logic 204, which is responsible for carrying out some or all of the techniques described herein. Program logic 204 includes logic for providing a browser-based integrated development environment that has one or more commands available to a user that have been implemented at least in part using a dynamic language (e.g. such as JavaScript) 206; logic for using introspection to dynamically generate documentation regarding the one or more commands available to the user 208; logic for displaying upon request at least a portion of the documentation regarding the one or more available commands on a display device (e.g. in the form of code command completion suggestions and/or function documentation) 210; and other logic for operating the application 220. In one implementation, program logic 204 is operable to be called programmatically from another program, such as using a single call to a procedure in program logic 204.

Figure 3:
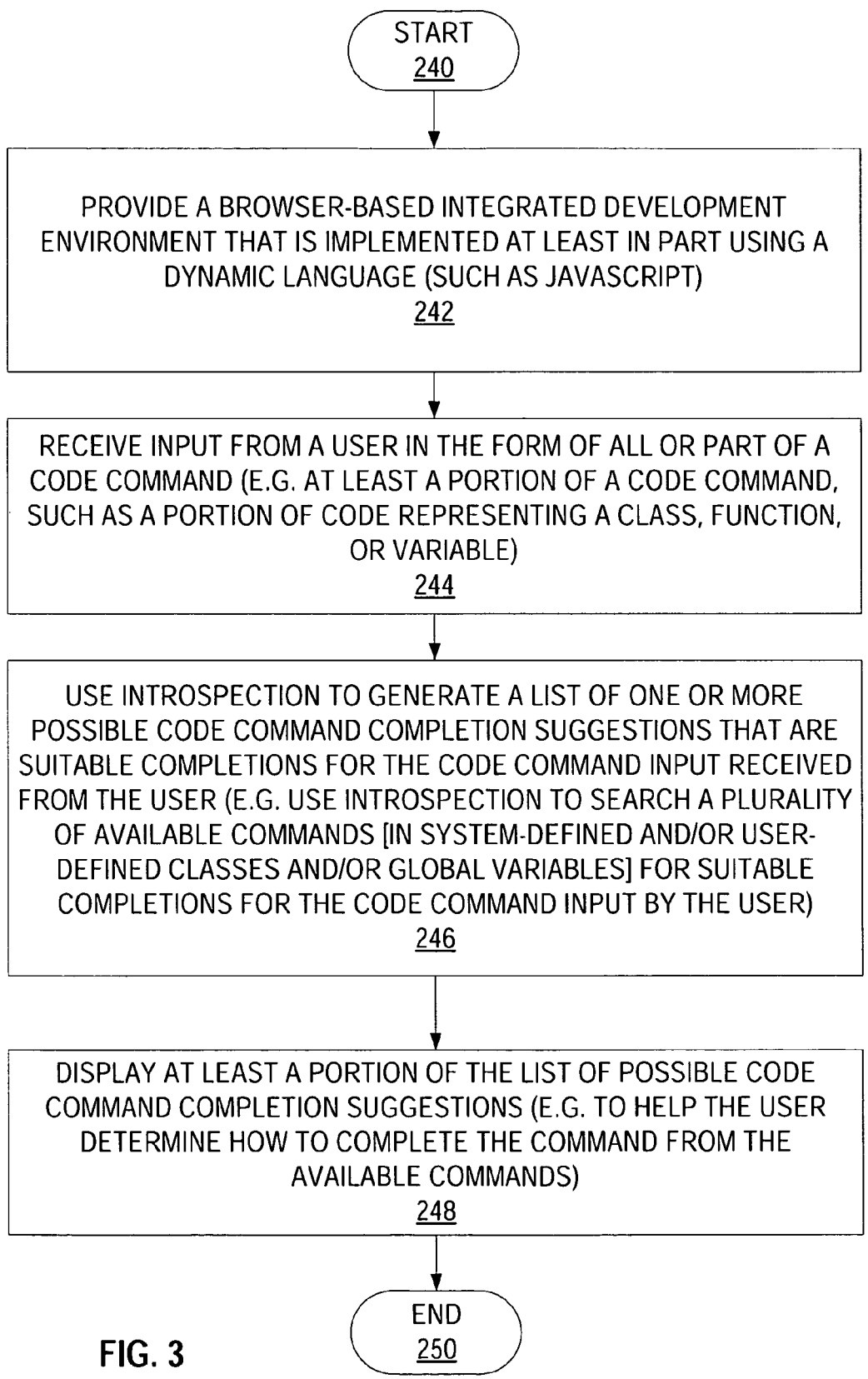
FIG. 3 is a high-level process flow diagram for one implementation of the system of FIG. 1.

Turning now to FIGS. 3-7 with continued reference to FIGS. 1-2, the stages for implementing one or more implementations of browser-based integrated development environment application 200 are described in further detail. FIG. 3 is a high level process flow diagram for browser-based integrated development environment application 200. In one form, the process of FIG. 3 is at least partially implemented in the operating logic of computing device 100. The procedure begins at start point 240 with providing a browser-based integrated development environment that is implemented at least in part using a dynamic language (such as JavaScript) (stage 242). The term "dynamic language" as used herein is meant to include scripting languages, such as JavaScript, that provide dynamic capabilities. A few non-limiting examples of such dynamic capabilities include removing the requirement to declare the type of a variable prior to its use, extending a running system with new functionality, or extending the type system of a running system. Input is received from a user in the form of all or part of a code command (e.g. at least a portion of a code command, such as a portion of code representing a class, function, or variable) (stage 244). Introspection is used to generate a list of one or more possible code command completion suggestions that are suitable completions for the code command input received from the user (stage 246). For example, introspection can be used to search a plurality of available commands in system-defined and/or user-defined classes and/or global variables to find suitable completions for the code command that was input by the user (stage 246). At least a portion of the list of possible code command completion suggestions are displayed (e.g. to help the user determine how to complete the command from the available commands) (stage 248). The process ends at end point 250.

Figure 4:
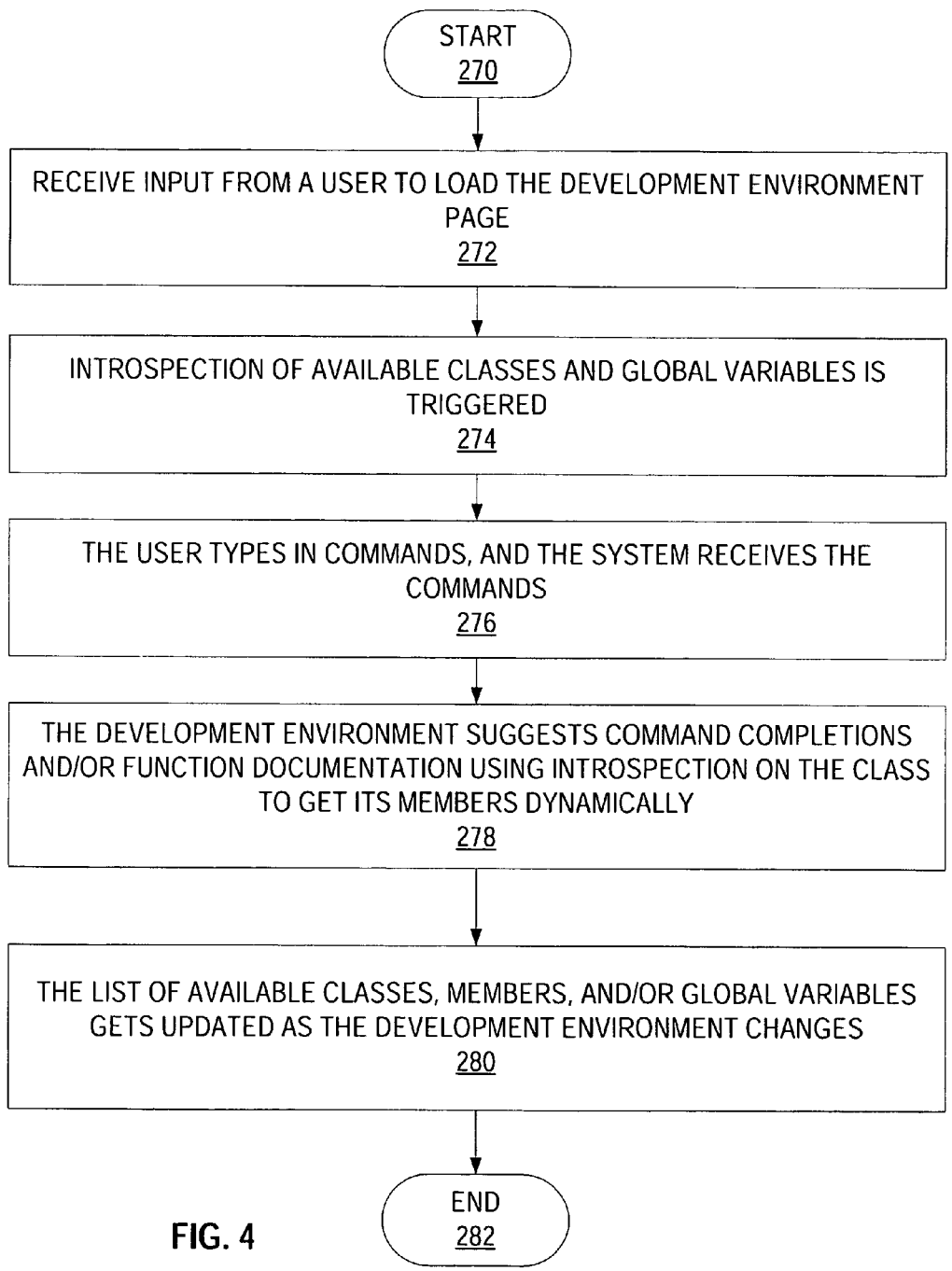
FIG. 4 is a process flow diagram for one implementation of the system of FIG. 1 illustrating the stages involved in using introspection to provide command completion suggestions and/or function documentation.

FIG. 4 illustrates one implementation of the stages involved in using introspection to provide command completion suggestions and/or function documentation. In one form, the process of FIG. 4 is at least partially implemented in the operating logic of computing device 100. The procedure begins at start point 270 with receiving input from a user to load the development environment page (stage 272). Introspection of available classes and global variables is triggered (stage 274). The user types in commands, and the system receives the commands (stage 276). The development environment suggests command completions and/or function documentation using introspection on the class to get its members dynamically (stage 278). The list of available classes, members, and/or global variables gets updated as the development environment changes (stage 280). The process ends at end point 282.

Figure 5:
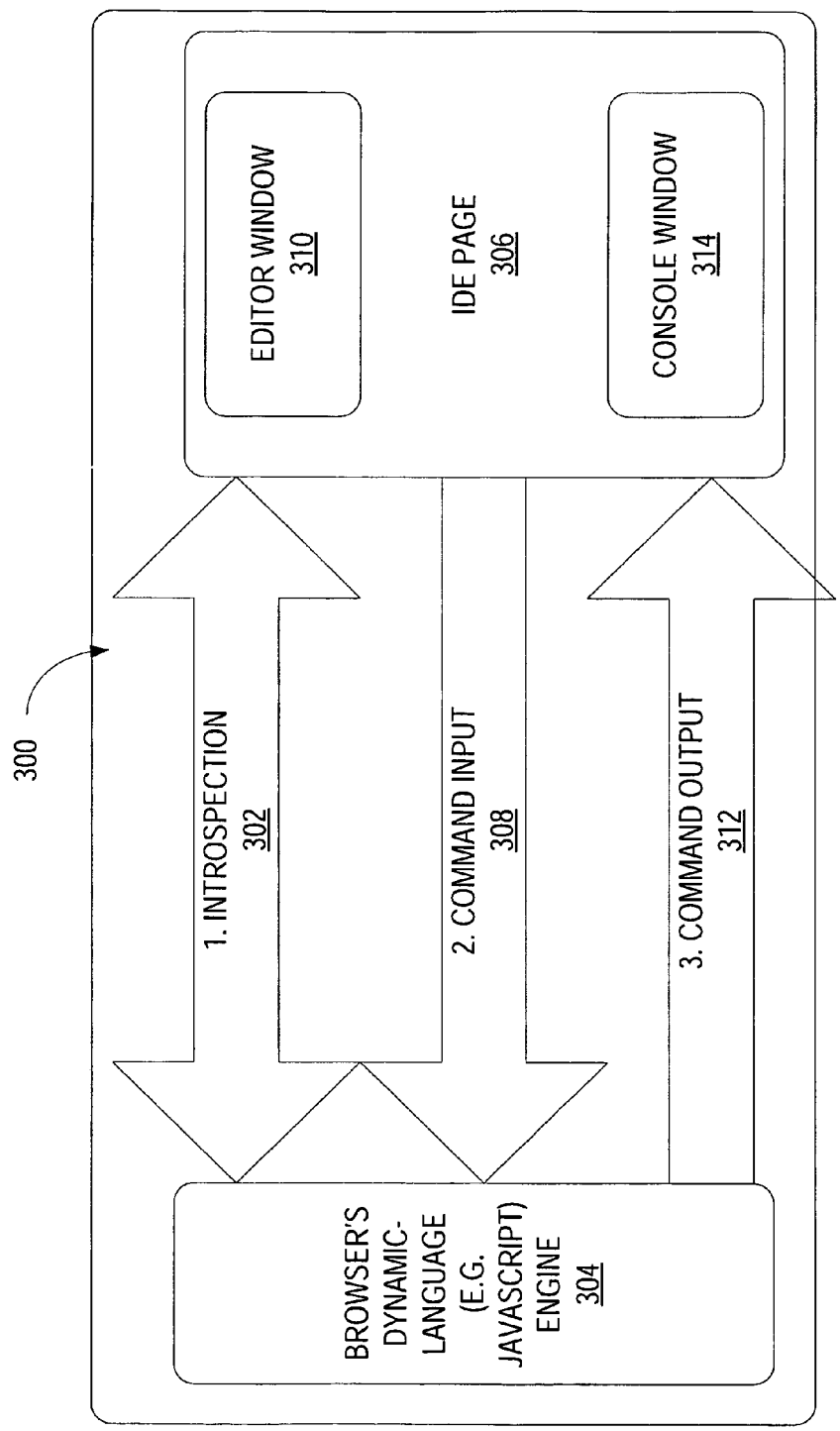
FIG. 5 is a logical diagram for one implementation of the system of FIG. 1 illustrating the flow of actions between the browser's dynamic language engine and the web page when introspection is used for providing command completion suggestions.

FIG. 5 is a logical diagram 300 that illustrates one implementation of a flow of actions between the browser's dynamic language engine 304 and the web page of the integrated development environment 306 when introspection 302 is used for providing command completion suggestions. In one form, the process of FIG. 5 is at least partially implemented in the operating logic of computing device 100. Introspection 302 is performed by the browser's dynamic language engine 304 when some activity occurs in the IDE page 306 to initiate the process. For example, when the user inputs a source code command 308, the introspection process is performed 302 to provide the possible command completion suggestions and/or function documentation in the editor window 310 of the IDE page 306. The console window 314 can also display some or all of these results if appropriate.

Figure 6:
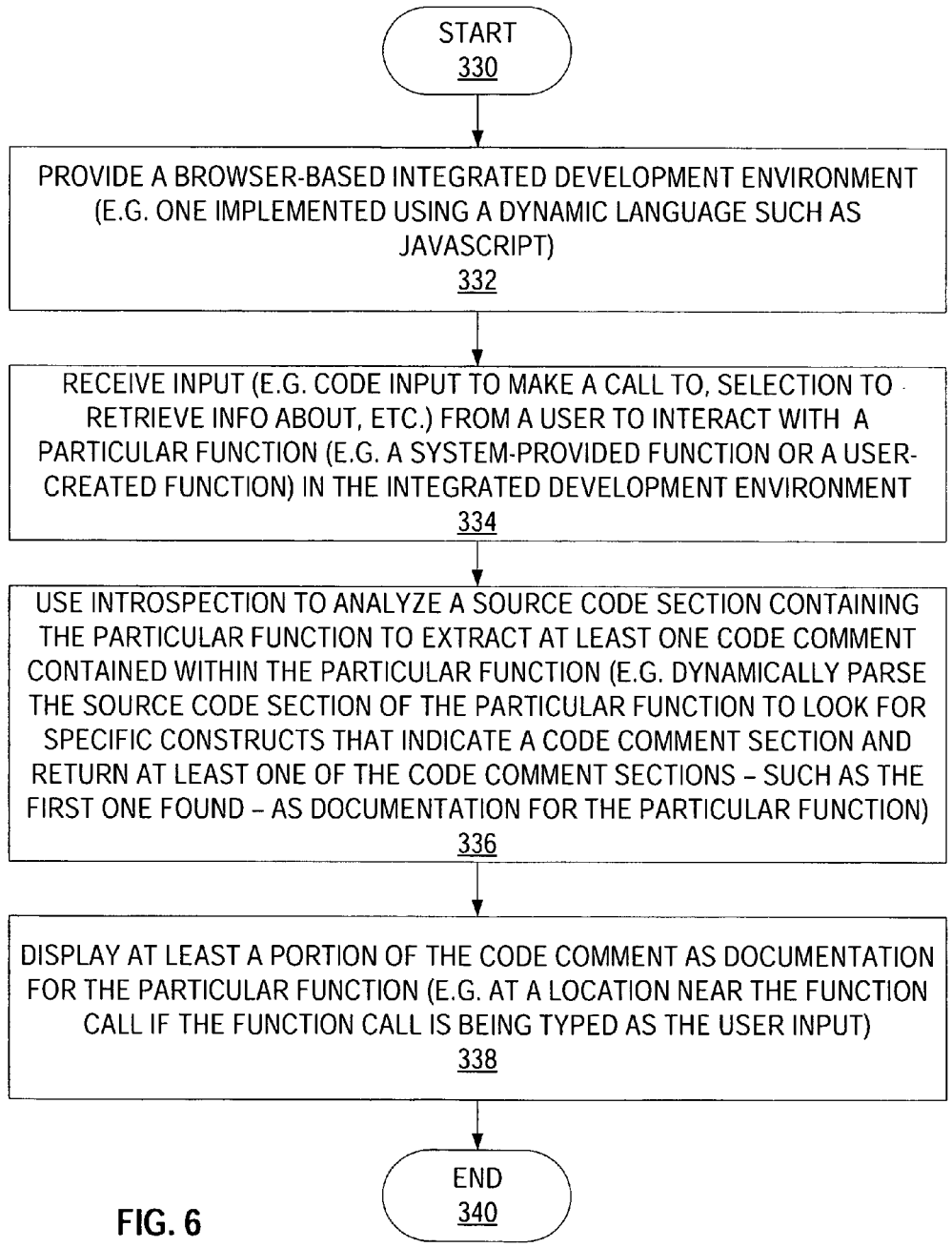
FIG. 6 is a process flow diagram for one implementation of the system of FIG. 1 illustrating the stages involved in using introspection to provide function documentation.

FIG. 6 is a process flow diagram that illustrates one implementation of the stages involved in using introspection to provide function documentation. In one form, the process of FIG. 6 is at least partially implemented in the operating logic of computing device 100. The procedure begins at start point 330 with providing a browser-based integrated development environment (e.g. one implemented using a dynamic language such as JavaScript) (stage 332). Input is received from a user to interact with a particular function (e.g. a system-provided function or a user-created function) in the integrated development environment (stage 334). In one implementation, the input can be in the form of code input for a function call to make and/or in the form of a selection of a particular item or command, etc. (stage 334).

Using introspection, the system analyzes a source code section containing a particular function to extract at least one code comment contained within the particular function (stage 336). In one implementation, the system dynamically parses the source code section of the particular function to look for specific constructs (such as "//", etc.) that indicate a code comment section and returns at least one of the code comment sections as documentation for the particular function (stage 336). The code comment that is returned can be the first code comment present in the function, or one or more later comments (stage 336). At least a portion of the code comment is displayed as documentation for the particular function (e.g. at a location near the function call if the function call is being typed as user input) (stage 338). The process ends at end point 340.

Figure 7:
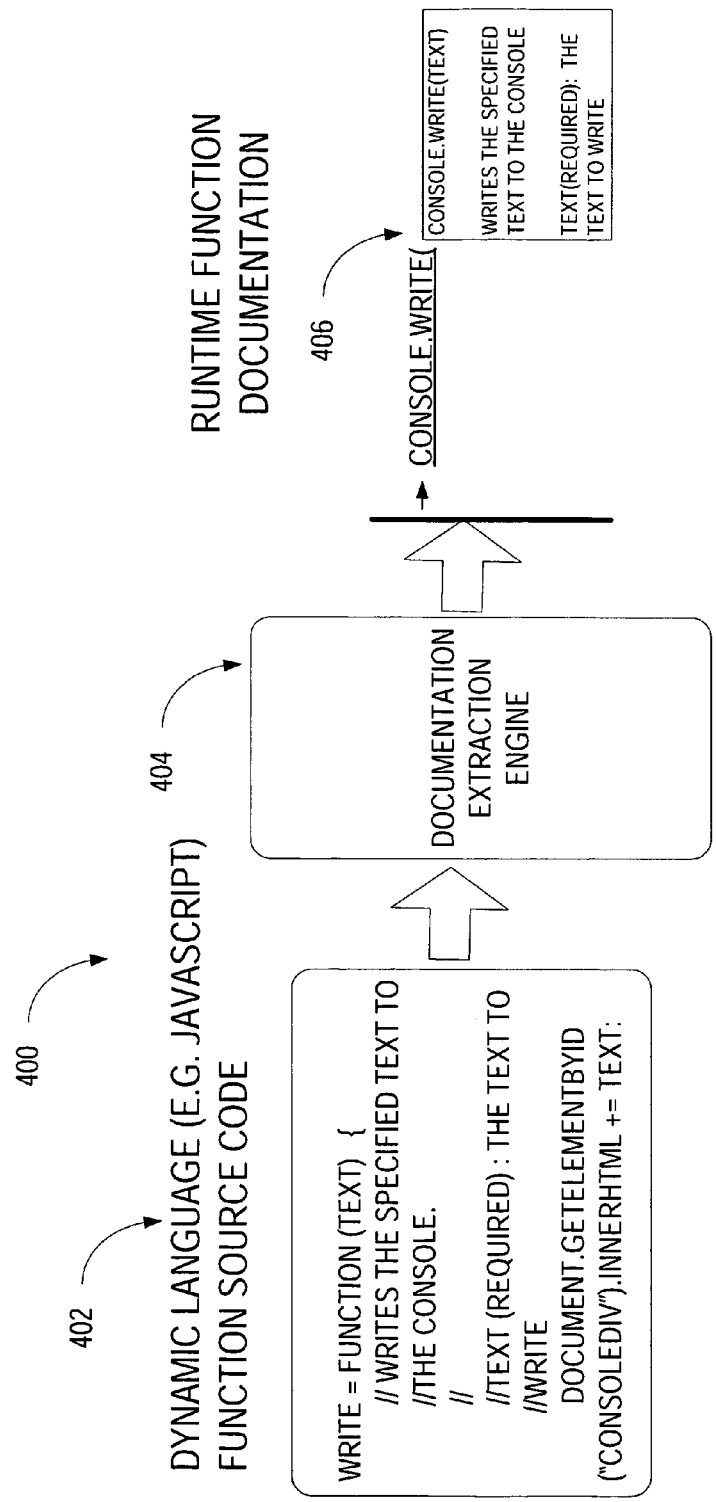
FIG. 7 is a logical diagram for one implementation of the system of FIG. 1 that illustrates the flow of actions and the end result when using introspection to provide function documentation.

FIG. 7 is a logical diagram 400 that illustrates one implementation of a flow of actions and an end result when using introspection to provide function documentation. In one form, the process of FIG. 7 is at least partially implemented in the operating logic of computing device 100. The function source code is provided in a dynamic language such as JavaScript 402. In the example shown in FIG. 7, the function source code includes code comments with "//" as the construct for each comment line. The source code is provided to the documentation extraction engine 404. The runtime function documentation 406 that was extracted from the function using introspection is then displayed in the browser to the user to give the user more information about that particular function.

Figure 8:
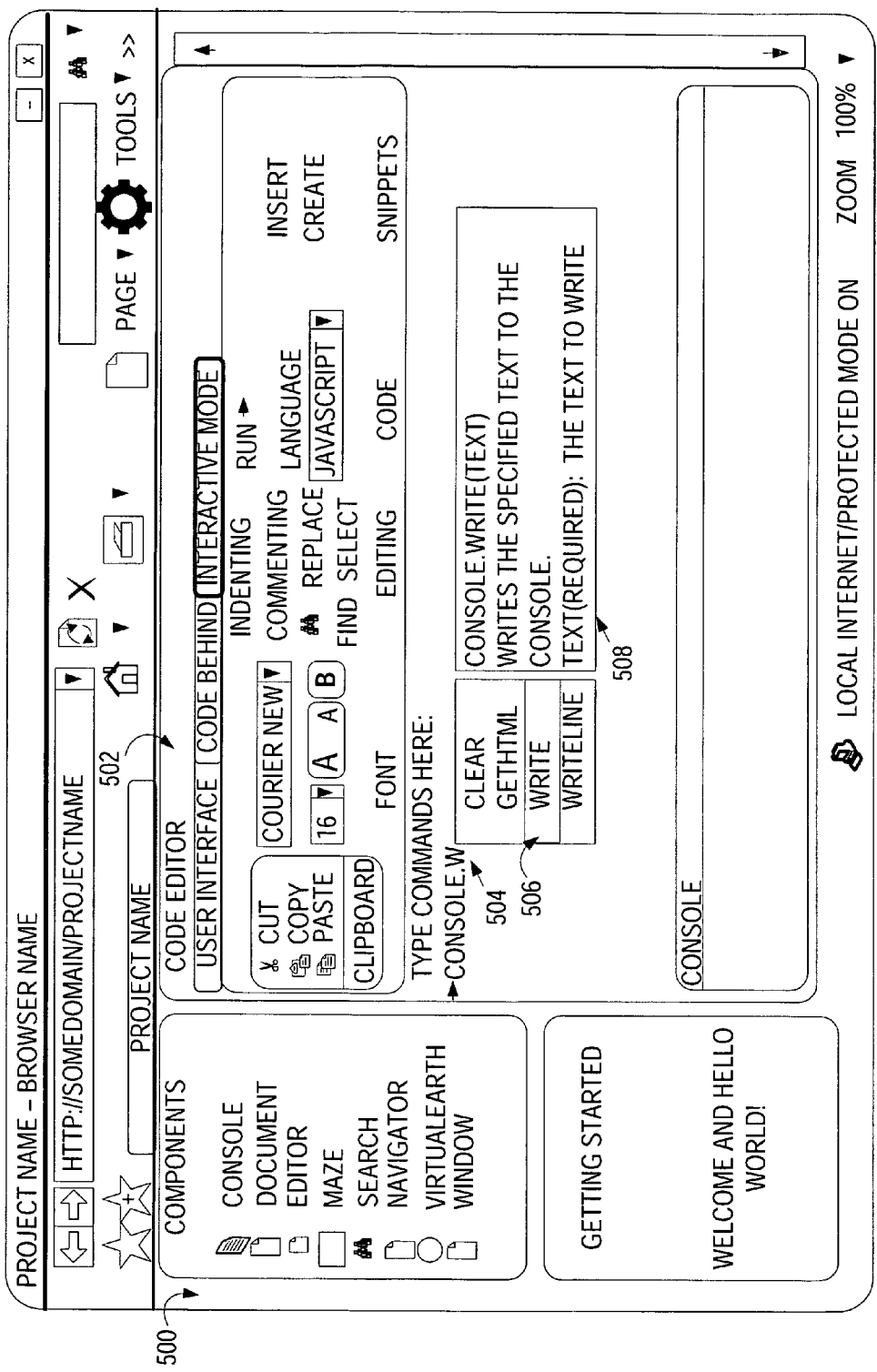
FIG. 8 is a simulated screen for one implementation of the system of FIG. 1 that illustrates providing command completion suggestions and function documentation using introspection.

Turning now to FIG. 8, a simulated screen 500 is shown to illustrate a user interface that provides a command completion suggestion 506 and function documentation 508 that were generated using introspection with browser-based integrated development environment application 200. As the user types a partial command 504 in code editor 502, the command completion suggestion 506 is displayed to provide the user with suggestions for how to complete the command. When the user selects the particular command completion suggestion 506, the function documentation 508 for that selected function is displayed. Although the command completion suggestion and the function documentation are shown together in this example, they can also be displayed separately and/or in other scenarios than shown in this non-limiting example. As one non-limiting example, the user could be presented with a list of all functions available in the program, and then be provided with the function documentation for a particular selected function from the list.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A computer-readable storage memory having computer-executable instructions for causing a computer to perform steps comprising:
provide a browser-based integrated development environment that has one or more code commands available to a user that have been implemented at least in part using a dynamic language;
receive input from a user in a form of at least a portion of a code command, the code command implemented at least in part using a dynamic language;
use introspection of the browser-based integrated development environment to dynamically generate a list of one or more possible code command completion suggestions that are suitable completions for the input received from the user, wherein at least a portion of the code command completion suggestions are generated from searching a plurality of available commands for one or more suitable completions to the code command input by the user, wherein introspection is performed against one or more available classes and global variables implemented using the dynamic language in the integrated development environment; and
display at least a portion of the list of possible code command completion suggestions.

2. The computer-readable storage memory of claim 1, wherein the one or more code commands available to the user have been implemented using JavaScript as the dynamic language.

3. A method for providing dynamic code completion suggestions comprising the steps of:

providing a browser-based integrated development environment that is implemented at least in part using a dynamic language;

receiving input from a user in a form of at least a portion of a code command, the code command implemented at least in part using a dynamic language;

using introspection of the browser-based integrated development environment that is implemented at least in part using a dynamic language to dynamically generate a list of one or more possible code command completion suggestions that are suitable completions for the input received from the user, wherein at least a portion of the code command completion suggestions are generated from searching a plurality of available commands for one or more suitable completions to the code command input by the user, wherein using introspection is performed against one or more available classes and global variables implemented using the dynamic language in the integrated development environment; and displaying at least a portion of the list of possible code command completion suggestions.

4. The method of claim 3, wherein the dynamic language is JavaScript.

5. The method of claim 3, wherein at least a portion of the available commands are system-defined.

6. The method of claim 3, wherein at least a portion of the available commands are user-defined.

7. A computer-readable storage memory having computer-executable instructions for causing a computer to perform the steps recited in claim 3.

8. A computer system comprising:

a processing unit coupled to a memory, the memory storing computer-executable instructions for causing the processing unit to:

provide a browser-based integrated development environment that is implemented at least in part using a dynamic language;

receive input from a user in a form of at least a portion of a code command, the code command implemented at least in part using a dynamic language;

use introspection of the browser-based integrated development environment that is implemented at least in part using a dynamic language to dynamically generate a list of one or more possible code command completion suggestions that are suitable completions for the input received from the user, wherein at least a portion of the code command completion suggestions are generated from searching a plurality of available commands for one or more suitable completions to the code command input by the user, wherein introspection is performed against one or more available classes and global variables implemented using the dynamic language in the integrated development environment; and provide at least a portion of the list of possible code command completion suggestions.

9. The computer system of claim 8, wherein the dynamic language is JavaScript.

10. The computer system of claim 8, wherein at least a portion of the available commands are system-defined.

11. The computer system of claim 8, wherein at least a portion of the available commands are user-defined.

* * * * *